Feb. 13, 1951          E. T. TOMLINSON          2,541,950
CONCRETE BLOCK MOLD
Filed May 20, 1947          2 Sheets-Sheet 1
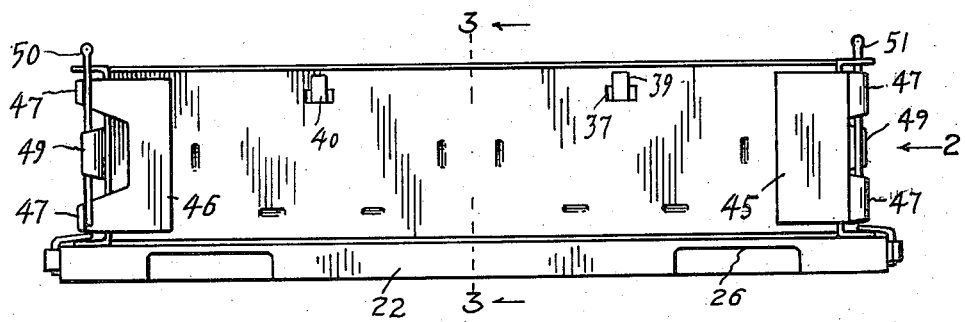
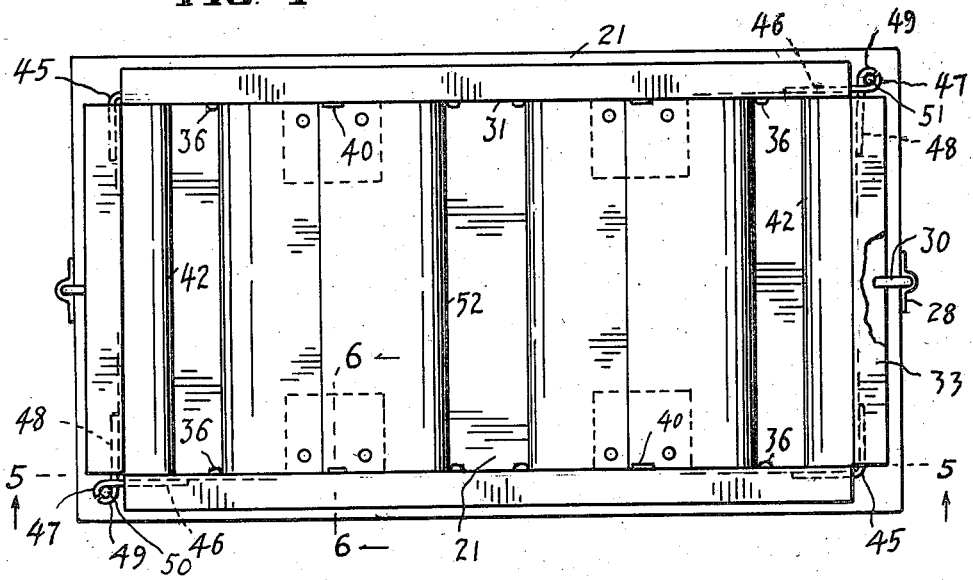
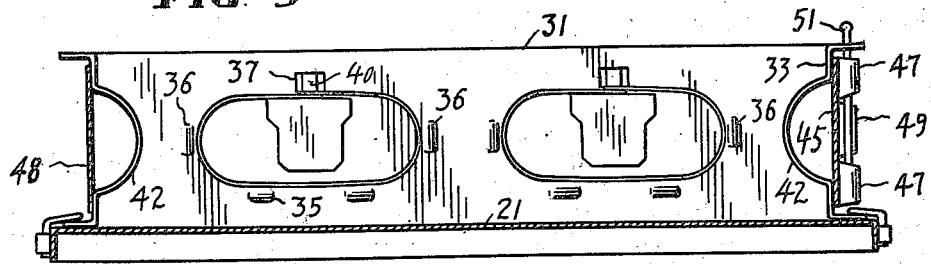
INVENTOR
EARL T. TOMLINSON
ATTORNEY Feb. 13, 1951      E. T. TOMLINSON      2,541,950
CONCRETE BLOCK MOLD
Filed May 20, 1947      2 Sheets-Sheet 2
FIG. 2
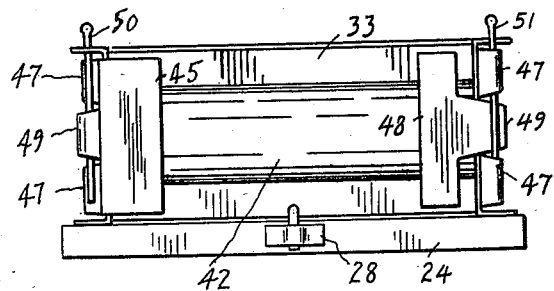
FIG. 9
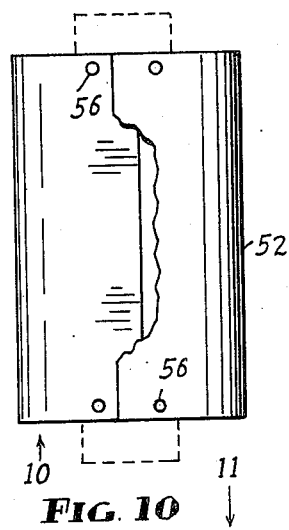
FIG. 3
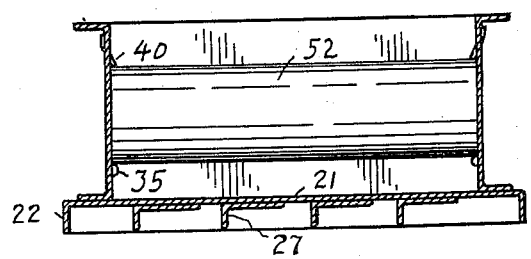
FIG. 10
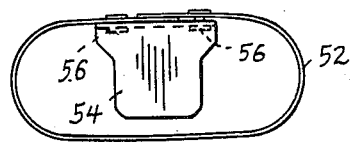
FIG. 6    FIG. 7    FIG. 11
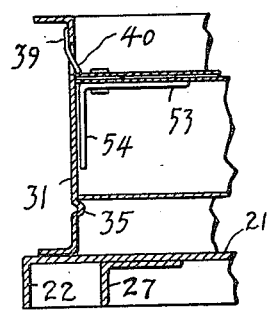 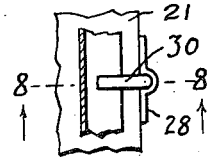 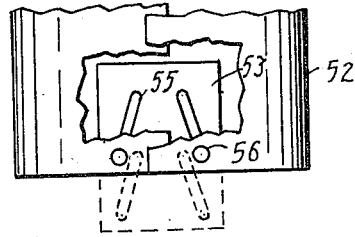
FIG. 8
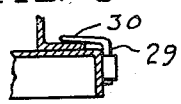
FIG. 12
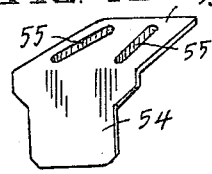
FIG. 13
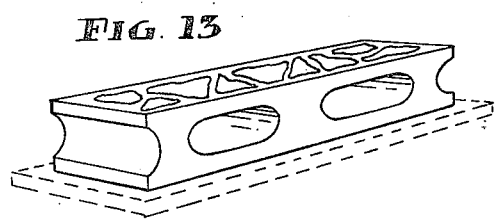
INVENTOR
EARL T. TOMLINSON
By Thomas L. Ryan
ATTORNEY Patented Feb. 13, 1951

2,541,950

UNITED STATES PATENT OFFICE 2,541,950

CONCRETE BLOCK MOLD

Earl T. Tomlinson, Yorktown, Ind.

Application May 20, 1947, Serial No. 749,176

3 Claims. (Cl. 25—121)

This invention relates to improvements in apparatus of the type intended for use in the molding and producing of a building-block composed of cement, said block being provided with air spaces extending therethrough, and the face portion of said block having inlays, as of pieces of stone or the like.

The object of my invention, broadly stated, is to provide an apparatus which will so lend itself to the purposes intended therefor, that the time and labor required for producing a block geometrically true in form and dimensions, and with face inserts practically embodied, are minimized. Said general object, and also certain aims devoted to improvements in structural features looking to economy of manufacture, lightness in weight, and to facility and convenience in handling and manipulating, are accomplished by, and my invention is embodied typically in the new construction, combination and arrangement of parts described in the following specification, and illustrated in the accompanying drawings wherein suitable characters are applied to the parts of the invention as they appear in the different views.

In the drawings—

Figure 1 is a side view of my improved molding apparatus, and which may be designated as a mold.

Figure 2 is an end view, in the direction of arrow 2 in Figure 1.

Figure 3 is a cross section view, taken on broken line 3—3 in the direction of arrow 3 in Figure 1.

Figure 4 is a top plan view of the apparatus.

Figure 5 is a vertical longitudinal sectional view, taken on broken line 5—5, in the direction of arrow 5 in Figure 4.

Figure 6 is an enlarged vertical cross section view, taken on the broken line 6—6 in the direction of arrow 6 in Figure 4.

Figure 7 is an enlarged detached detail top plan view of an end portion of the base plate and the fastener connection combined therewith.

Figure 8 is a vertical sectional view taken on the broken line 8—8 in Figure 7.

Figure 9 is a top plan view of one of the cores.

Figure 10 is an end view of said core, as in the direction of arrow 10 in Figure 9.

Figure 11 is a top plan view of an end portion of said core, in the direction of arrow 11 in Figure 10, portion of the lapped margins of the sheet metal composing said core, being broken away.

Figure 12 is a perspective view of one of the two handle clips of the said core, detached.

Figure 13 is a perspective view indicating the appearance of a block as formed by my improved mold, and as resting on the baseplate of the mold, the confining wall sections of the apparatus having been disassembled, and the cores having been relieved from their supported positions, and having been removed from the molded block.

The base member of my improved mold consists of a sheet metal plate 21 formed with downturned flanges 22 and flanges 24. Recesses 26 in said side flanges constitute suitable hand-holds. Integrated with the underside of said base plate, as by welding, are angle bars 27 suitably aligned and spaced to function as stiffeners.

In a pillow block 28 which is integrated, as by welding, with each of the end margins of said base plate, is journaled a dog 29 embodying a slightly upwardly inclined nose 30, as indicated in Figures 7 and 8.

A confining structure consists of similar wall sections, L shaped in plan formation, their free ends being detachably fastened together. The said structure is adapted to be reposed on the surface of said base plate. Each of said wall sections consists of a side portion made of sheet metal channel-shaped in cross section and which is designated as side channel 31; and of an end portion similarly made of sheet metal channel-shaped in cross section and which is designated as cross channel 33. Provided in the web of each of said side channels 31, are pairs of indentations which form inward embossments, the plane of the lower embossments 35 being a predetermined height above the plane of the lower side of the channel, and the plane of the upper embossments 36 being at a predetermined distance above the plane of the embossments 35. At a point equidistant from, and at a plane a predetermined distance above the plane of the embossments 35, is an aperture 37.

Integrated with the exterior face of each of the said side channels 31, at a location immediately adjacent to each of said apertures 37 is a leaf spring 39 whose free portion 40 extends downwardly and diagonally and through said aperture to a point slightly beyond the vertical plane of the inner face of said channel. This device I designate as a latch. Its function will presently be explained.

The web portion of each of the cross channels 33 is semi-circular in cross section, and it forms a transverse semi-cylindrical pattern 42.

Each of said side channels 31 is integrated at an end thereof, with an end of a cross channel 33 at a right angle thereto, as by an angular gusset 45. The structures thus formed, each being L shaped in plan formation, I designate as wall sections.

Integrated with each side channel 31 at the free end thereof, as by welding, is a bifurcated plate 46, each fork thereof embodying a hook 47 which is adjacent to the end of said channel.

Integrated with the free end of each of the cross channels 33 as by welding, is a plate 48 with tongue embodying a hook 49 adjacent to the end of said channel.

Adapted to be lowered into position engaged by the said hooks 47 and 49, are lock pins 50 and 51.

The wall sections above described are light in weight, strong, and durable; and are capable of being manufactured economically, and of being easily cleansed and readied for repeated use in pinned together status as indicated in the plan view Figure 4.

Each of two cores shown consists of a resilient sheet metal plate 52 of suitably light gauge, and of width equivalent to distance between the confronting faces of the side channels 31, and curled to an oval shape in cross section. The urge of said plate is outward, and one end of said plate overlaps the other.

In the horizontal leg 53 of an angle shaped handle clip which is disposed within said core at each end thereof, are convergent complemental slots 55.

By wrists 56 which are fixed in the corners of the meeting end portions of said plate 52, and which said wrists (see Figures 9 and 11, reside free in the outboard ends of the said slots 55), the said handle clip is in loosely jointed union with the core plate, the upright leg 54 of said clip being within the vertical plane of the end of the core. When the handle clip is in the retracted position shown, the core is of the expanded or full size, in cross section, as shown.

To perform the transaction of contracting the said core in cross section, the handle clips are simultaneously pulled in opposite directions, the convergent slots causing the wrists 56 to be drawn toward each other. In this transaction, the distance between the walls of the core are lessened, said walls thereby being contracted. The said transaction is performed after the block will have been cast, and the wall sections of the container structure will have been disconnected and removed, as will presently appear.

Procedure in using my invention, is briefly described, as follows:

The several parts of the apparatus, namely, the L shaped wall sections, the cores, and the base plate, are made ready, that is to say, the inner surfaces of said wall sections, the top surface of the base plate, and the outer surfaces of the cores are made clean and are treated with a film of thin oil. A supply of cement mix consisting, for example, of plastic cement or its equivalent one part, and of sand, four parts; also a supply of pieces of rock or stone that are to be embodied in the face portion of the proposed block, are in readiness.

On a deck structure (not shown) located suitably near the cement-mix supply, an operative disposes the base plate 21. A pair of wall sections, pinned together by the pins 50 and 51, is then disposed upon the said base plate and is fastened thereon by turning the dogs 29 to tightened positions with their noses impinged to binding engagement with the lower flange of the cross channels 33. Cement-mix is then deposited in the mold to a depth slightly above the plane of the lower embossments 35. The cores are then lowered to place, their squared ends being in directly engaged abutting and closing union with the inner faces of the side channels 31 and 31, and at rest on the said lower embossments 35, and between, and stayed against longitudinal dislodgement by the upper embossments 36. In the above transaction of lowering the cores to the seated position described, the spring latches 40 will have automatically become engaged with the ends of the top side of said cores, said cores thereby being held against being dislodged from their positions supported between and in closed engagement with said side-channels, as above described.

Additional quantity of the cement-mix is then deposited to a level slightly below the plane of the tops of said channels. The operative now places the stone pieces in the mix so contained in the mold, and works same until they are suitably imbedded so that their obverse faces are at a plane coincident with the plane of the top of the mold, or at a plane slightly above the plane of the top of said mold, as may be desired.

Then the molds, one after the other, after having been so filled, as above described, are, with their contents, transferred to a place where suitably dry air is available and where same are left to cure. The face portion of the cast is now conveniently available to the operative who with suitable implement in hand, may readily and conveniently point up the mix in the areas between the boundaries of the stone pieces. After approximately eight to ten hours, the lock pins 50 and 51 are removed, the dogs 29 are retracted, and the wall sections thus having been disconnected from each other, are readily removed.

In the transaction of removing each core, the operative grasps the handle clips 54 and pulls them in opposite directions. In this pulling of said handle clips the wrists 56 riding, as they do, in the convergent slots 55, cause the ends of the core plate to be drawn retractively longitudinally of the block, thereby contracting the core and enabling its being removed from the block. The block so formed, is now left in repose on the said base plate where it is conveniently available for the checking and final inspection, and from whence it may readily be removed after curing.

While the structural features and details of the embodiment herein illustrated for carrying my invention into effect have been particularly described, it will be understood that same are susceptible of modifications without departing from the spirit or principle of the invention. Accordingly I desire the invention to be construed as of the scope defined in the claims.

What I claim as my invention is:

1. Molding apparatus of the kind described comprising a horizontal base plate, a rectangular confining structure reposed on said base plate and composed of wall sections detachably interconnected in spaced confronting relation, the opposed faces each, of two of said opposed wall sections having spaced embossments located at a predetermined height, a latch located at a predetermined height above said embossments, and a core structure of length same as the distance between the said opposed wall faces, said core structure adapted to be disposed with its ends in abutting union with said faces, the lower portions of said ends being at rest on said embossments and the upper portions of said ends being engaged by said latches.

2. Molding apparatus of the kind described comprising a base plate, a rectangular confining structure reposed on said base plate the wall sections thereof being detachably interconnected in opposed spaced relation, the confronting faces each, of two of said opposed wall sections having sets of spaced embossments, said sets being located at planes one above the other, a latch located at a plane above the plane of each upper set of embossments, and a diametrically contractile core structure adapted to be disposed with its ends in abutting union with said faces and in engagement with the said embossments, and engaged by said latch.

3. A molding apparatus comprising a base plate, a confining structure reposed on said base plate consisting of vertical wall sections detachably interconnected in spaced opposed relation, the confronting faces each, of two of said opposed wall sections having sets of spaced embossments, said sets being located at planes one above the other, a latch located at a plane above the plane of each upper set of embossments, the confronting faces each, of the other two opposed wall sections embodying a horizontal pattern concavo-convex in cross section, lock devices operable to removably fasten at least two of the said opposed wall sections to the said base plate, and contractile cores adapted to be disposed with their ends in abutting union with the confronting faces of the two opposed wall sections first above mentioned, and in engagement with said embossments and engaged by said latches.

EARL T. TOMLINSON.

REFERENCES CITED

The following references are of record in the file of this patent:

UNITED STATES PATENTS

| Number | Name | Date |
| --- | --- | --- |
| 1,394,570 | Mitchell | Oct. 25, 1921 |
| 1,462,569 | Federicci | July 24, 1923 |
| 1,526,667 | Flam | Feb. 17, 1925 |
| 1,540,185 | Richards | June 2, 1925 |
| 1,652,180 | Nicholas | Dec. 13, 1927 |